(12) United States Patent
Nawas

(10) Patent No.: US 10,637,980 B1
(45) Date of Patent: Apr. 28, 2020

(54) ADJUSTABLE MOBILE DEVICE HANGER

(71) Applicant: Edmond Nawas, Toronto (CA)

(72) Inventor: Edmond Nawas, Toronto (CA)

(*) Notice: Subject to any disclaimer, the term of this patent is extended or adjusted under 35 U.S.C. 154(b) by 0 days.

(21) Appl. No.: 16/709,883

(22) Filed: Dec. 10, 2019

Related U.S. Application Data

(60) Provisional application No. 62/885,132, filed on Aug. 9, 2019, provisional application No. 62/852,797, filed on May 24, 2019.

(51) Int. Cl.
  *H04M 1/06* (2006.01)
  *F16M 13/02* (2006.01)
  *B60R 11/02* (2006.01)

(52) U.S. Cl.
  CPC ....... *H04M 1/06* (2013.01); *A45F 2200/0516* (2013.01); *B60R 11/0241* (2013.01); *F16M 13/022* (2013.01)

(58) Field of Classification Search
  None
  See application file for complete search history.

(56) References Cited

U.S. PATENT DOCUMENTS

| | | | | |
|---|---|---|---|---|
| 6,614,908 B1* | 9/2003 | Huang | ................... | B60R 11/00 |
| | | | | 248/229.22 |
| 8,861,714 B1* | 10/2014 | Leibenhaut | ............. | H04M 1/04 |
| | | | | 379/446 |
| 9,103,487 B2* | 8/2015 | Hale | ................... | G03B 17/566 |
| 9,408,456 B2* | 8/2016 | Hart | ........................ | A45F 5/021 |
| 9,541,957 B1* | 1/2017 | Liu | ........................ | G06F 1/1632 |
| 9,709,213 B2* | 7/2017 | Zheng | ................... | F16M 11/40 |
| 10,086,771 B2* | 10/2018 | Barre | ..................... | B60R 11/02 |
| 10,118,565 B2* | 11/2018 | Kim | ........................ | B60R 11/02 |
| 2011/0297714 A1* | 12/2011 | Freeman | ................... | B60R 7/04 |
| | | | | 224/483 |
| 2012/0080465 A1* | 4/2012 | Son | ......................... | B62J 11/00 |
| | | | | 224/276 |
| 2013/0206942 A1* | 8/2013 | Trotsky | ................ | F16M 11/041 |
| | | | | 248/274.1 |
| 2014/0263931 A1* | 9/2014 | Chen | .................... | F16M 11/041 |
| | | | | 248/576 |

* cited by examiner

*Primary Examiner* — Quoc D Tran

(57) ABSTRACT

An adjustable mobile device hanger with three slidable sections and two secure gripping bodies that can accommodate small cell phones as well as large tablets, with an attached top single hook that can hang on any protruding object, narrow edge or rod and has full vertical rotational capacity along with easily adjustable horizontal pivotal capability to provide varying viewing angles and directions while suspended on a variety of objects, structures and surfaces, indoors or outdoors, to accommodate a variety of situations and tasks.

3 Claims, 11 Drawing Sheets

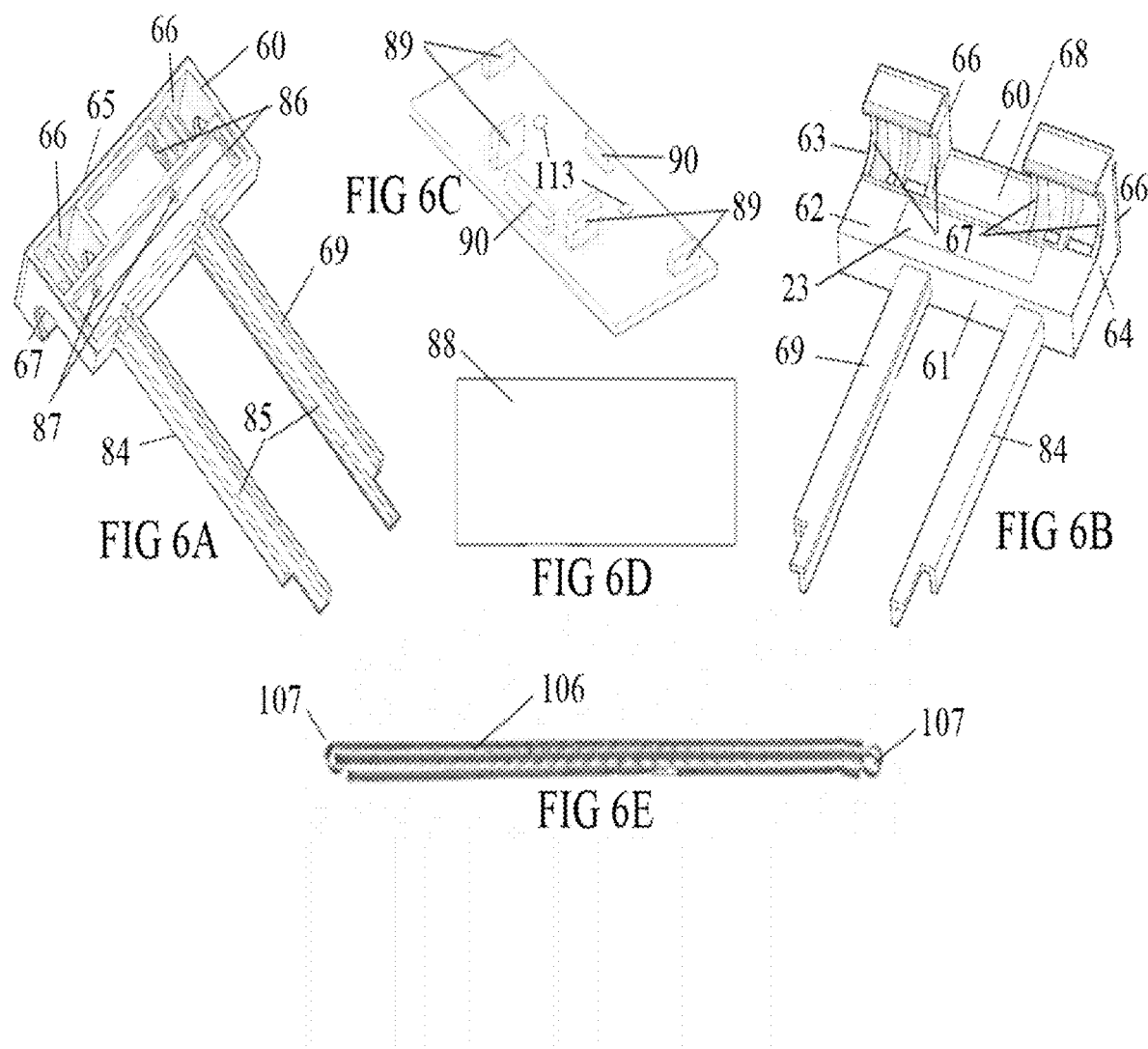

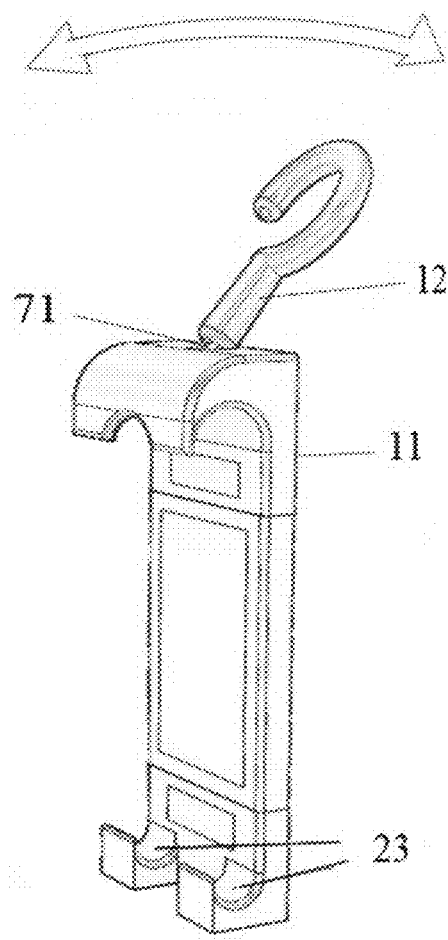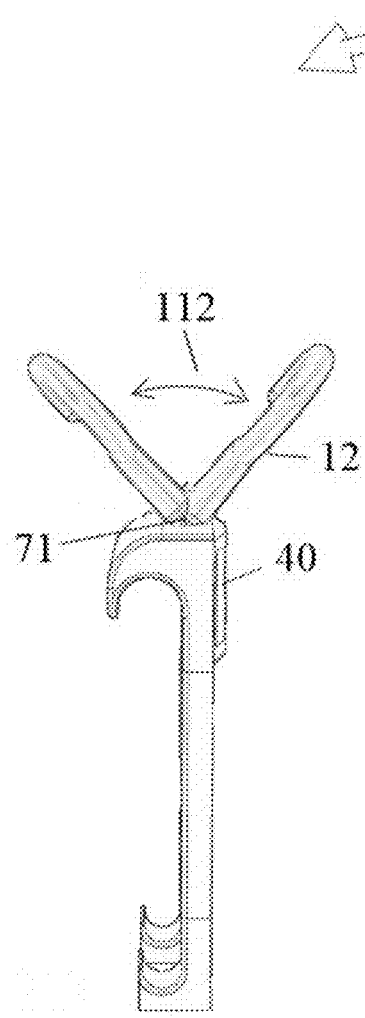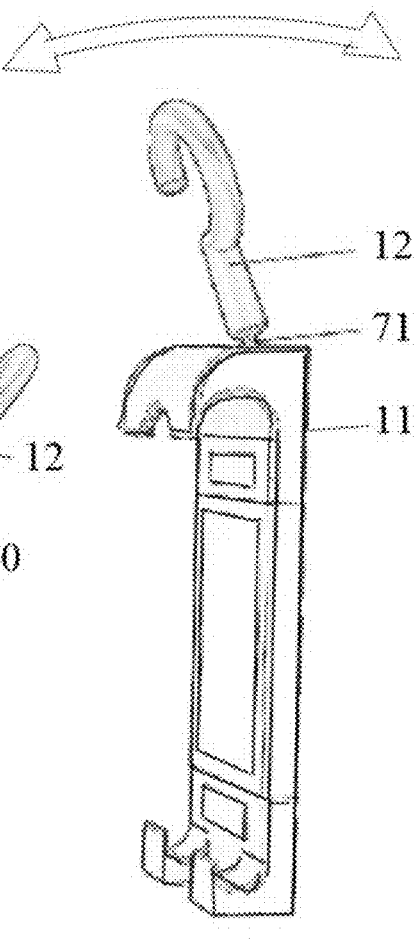
FIG 7A
FIG 7C
FIG 7B

ADJUSTABLE MOBILE DEVICE HANGER

CROSS-REFERENCE TO RELATED APPLICATION

Please refer to Application Data Sheet for 2 Provisional Patent Applications

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Mobile devices such as cell phones and tablets are valued sources of information for entertainment as well as multi-communication and business tools. The devices are usually kept in a pocket or purse and manually handled for quick phone calls or short term use such as reading email or checking a calendar.

Usage of these devices for extended periods such as listening to music, conference calling or watching videos usually require placing the device on a flat surface or the use of an electronic device holder. The myriad of designs of electronic device holders and hangers encompassed by the crowded prior art were devised and utilized to mostly lie on a flat stable surface such as a table or a stand, exposing them to hazards such as youngsters, pets and accidents, or to be used in vehicles as stationary attachments, or to have limited functionality due to device size limitations, holding or hanging methods.

This invention addresses the need for a portable, easily adjustable, secure grip hanger that can accommodate varying device sizes from cell phones to tablets in a manner that allows the user to hang their device on a variety of objects, structures and surfaces at different vertical and horizontal gradients, indoors or outdoors, and for a multitude of situations and tasks. This need may be amplified in a kitchen setting where a cook may be following a recipe on their cell phone or tablet and needing all their kitchen counter space while prepping a meal. This invention allows a cook to view their device from a comfortable left, right or center angle and with a vertical pivot appropriate to their height and will allow them to move the hanger to different areas of a kitchen if they need to, by simply picking it up from one cabinet handle and placing it on another.

A user working on their vehicle and viewing a how-to video on their mobile device can also utilize this invention by hanging their toted device from the vehicle hood with ease and viewing it comfortably without endangering their device by placing it on the vehicle or engine. A trip to the beach, camping, biking, boating or viewing GPS in a vehicle are some other areas of use for this invention as well as night time use of the flash light function in a mobile device where the hands free versatility of this invention allows superior aim and focus.

BRIEF SUMMARY OF THE INVENTION

Embodiments of the present disclosure include an adjustable mobile device hanger that facilitates hands free viewing, broadcasting, communicating and interacting. The adjustable mobile device hanger (to be referred to as apparatus or apparatus 10) may comprise a rigid hook at the top, with an optional easily releasable proportional latch connected to the hook (not shown), wherein the base of the hook may connect to the upper elongated portion of a pivoting friction hinge with a constant torque profile, wherein the bottom elongated portion of the pivoting friction hinge may integrally connect to and embed in a freely rotatable cylindrical component, wherein the vertically aligned cylindrical component may be encased in a central circular segment of a rectangular housing body that in turn is enclosed within the interior walls of the upper body of this apparatus.

The upper body exterior may comprise a top flat wall that slopes forward and downward to encompass a concave area that compose a device gripping section of the upper body and is integrally connected to the vertical front wall that is integrally connected to two side walls that are integrally connected to the bottom wall that is integrally connected to two downward extending parallel slidable U-shaped legs. The back wall of the upper body is a removable cover that is secured in place with snaps or fasteners such as screws. The back cover exterior comprise a multi-angled surface to accommodate multiple viewing angles. The back cover interior comprise snaps, stabilizers and peg caps to ensure safe and stable connection to the upper body.

The top wall of the upper body encompass a round opening through which the upper portion of the pivoting friction hinge protrudes and embeds in the base of the hook. The upper body device gripping section comprising a protruding rigid concave shape encompassed within the sloping front wall may be coated with flexible rubbery material (not shown) or something similar to enhance the grip and cushion the toted electronic device. Two downward extending resilient slidable U-shaped legs enclosing one extension spring each wherein the legs slidably rest inside 2 laterally aligned channels located within the main body. Two protruding pegs from the front wall to anchor the extension springs are aligned with the U-shaped cavity of the slidable legs.

The main central body comprises a front wall that is integrally connected to the sectioned top wall, the sectioned bottom wall, the two side walls and six interior longitudinal walls. The back wall is a removable cover that is secured to the main body by snaps or fasteners such as screws in an embodiment. The main central body also comprises 4 slidable channels devised by the interior walls, that house the two upper u-shaped slidable legs as well as the two lower u-shaped slidable legs. The four slidable legs act as the resilient self adjusting connectors and stabilizers between the upper gripping body from the top and the lower gripping body from the bottom to the central main body. The slidable legs each enclose an extension spring with one circular end of the spring attached to a protruding rigid peg in the upper or lower body and the other circular end of the spring attached to a protruding rigid peg in the main body at the end of the corresponding channel in an embodiment. The extension springs furnish the steady lateral force keeping the upper, middle and lower bodies taut and extendable to accommodate their mobile devices load. The middle body cover comprise a flat wall integrally connected to two side walls as well as snaps, peg caps, stabilizers and slidable leg blockers.

The lower body comprise a bottom wall that extends forward at the left and right sides to form a base for two upward facing concave areas that compose the gripping section of the lower body. A middle area of the front wall may be kept unobstructed to facilitate electric charging of the toted device. The bottom wall is integrally connected to the front wall that is integrally connected to the two side walls that are integrally connected to the top wall that is integrally connected to two upward extending resilient slidable U-shaped legs. The back wall is a removable cover that is secured in place with snaps or fasteners such as screws in an embodiment.

Two lower body device gripping areas located at either side of the front wall may be coated with flexible rubbery material or something similar, to enhance the grip and cushion the electronic device. The two upward extending resilient slidable U-shaped legs enclose one extension spring each wherein one circular end is attached to a lower-body front wall protruding peg in line with the U-shaped cavity in each slidable leg, and the other circular end is attached to a middle-body protruding peg located at the end of the corresponding channel. The lower body cover comprises a rectangular flat wall with snaps, stabilizers and peg caps.

BRIEF DESCRIPTION OF DRAWINGS

FIG. 6A shows an inside perspective view of a bottom body of an embodiment of the adjustable mobile device hanger.

FIG. 6B shows a front exterior perspective view of a bottom body of an embodiment of the adjustable mobile device hanger.

FIG. 6C shows an inside perspective view of a cover of a bottom body of an embodiment of the adjustable mobile device hanger.

FIG. 6D shows an exterior front view of a cover of a bottom body of an embodiment of the adjustable mobile device hanger.

FIG. 6E shows a front view of an extension spring with cross center loop ends that is a component of an embodiment of the adjustable mobile device hanger.

FIG. 7A shows a side perspective view of an embodiment of an adjustable mobile device hanger with a friction hinge and a hook pivoted at an angle towards the back of the hanger.

FIG. 7B shows a side perspective view of an embodiment of an adjustable mobile device hanger with a friction hinge and a hook pivoted at an angle towards the front of the hanger.

FIG. 7C shows a side view of an embodiment of an adjustable mobile device hanger displaying a range of pivoting capability of a friction hinge and the attached hook that enables the hanger to be adjusted to an optimum viewing angle when hanging on a vertical surface.

DETAILED DESCRIPTION OF THE INVENTION

The following detailed description of the invention provides example embodiments of the Adjustable Mobile Device Hanger and is not intended to limit the invention or the application and uses of the invention.

Figure 1:
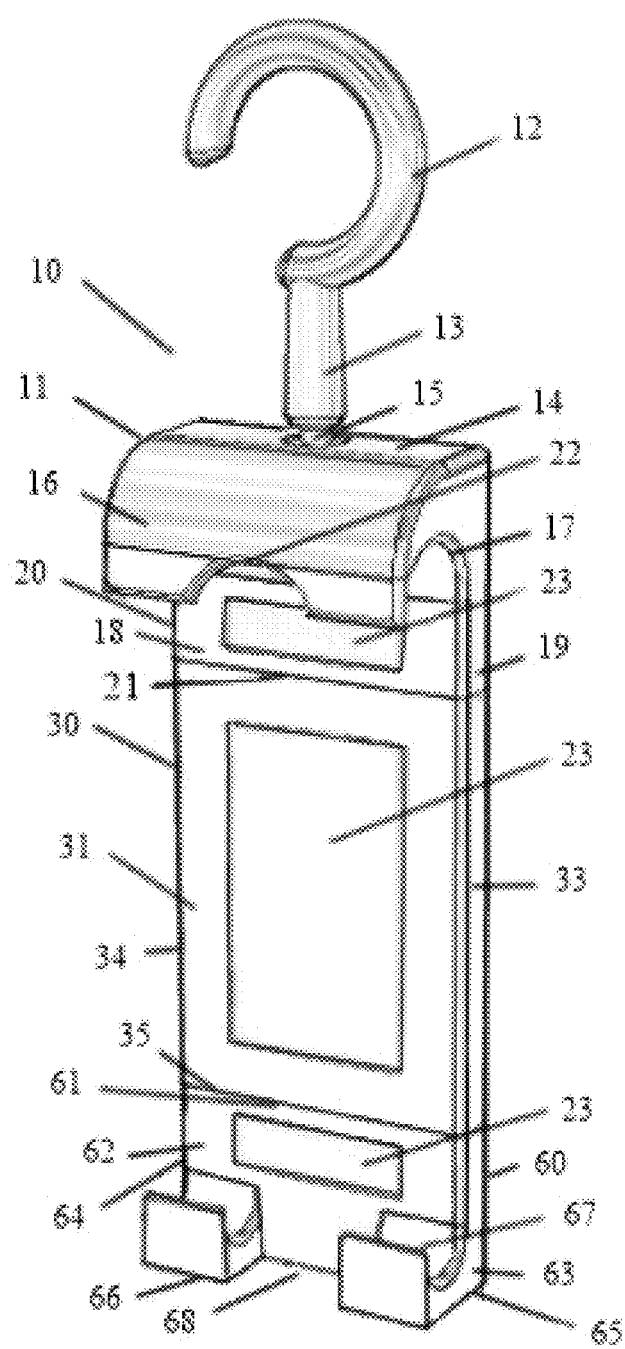
FIG. 1 shows a front perspective view of an embodiment of the adjustable mobile device hanger.

In the embodiment illustrated in FIG. 1, apparatus 10 is made up of 5 separate bodies that are connected to one another by varying means for varying functions facilitating the most advantageous use of the invention. The five bodies comprise a hook 12, an upper body 11 which contains a rectangular housing body 52, a middle body 30 and a bottom body 60. Starting at the very top is hook 12 which is comprised of an upper hooking section that can take any round or oval shape without detracting or departing from the spirit and scope of this invention disclosure. Hook 12 is made of rigid material that can withstand the weight of hanger 10 and the securely toted mobile device including very large tablets.

Figure 3A:
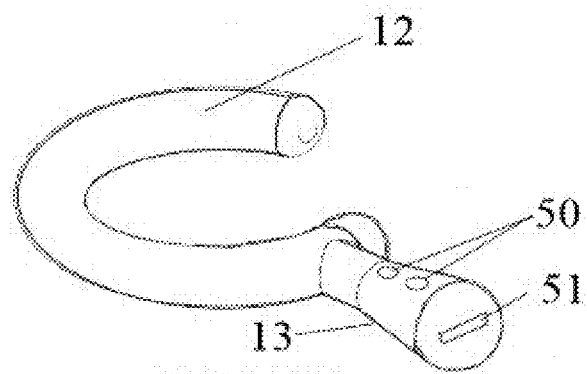
FIG. 3A shows a hook body of an embodiment of an adjustable mobile device hanger wherein the base of the hook has a rectangular opening at the bottom allowing the top portion of a friction hinge to be inserted and embedded in the hook, as well as circular openings on the side of the base of the hook that function as the entry point for pegs to anchor the aforementioned friction hinge to the base of the hook base.
Figure 3B:
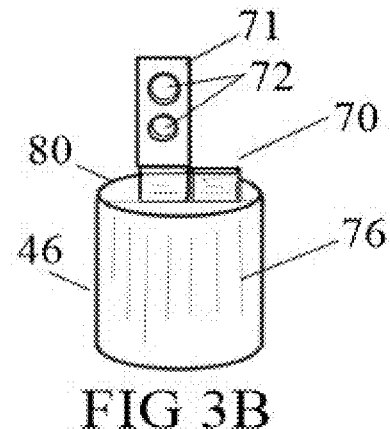
FIG. 3B shows the assembled body of components comprising the friction hinge embedded in the cylindrical shaped body made up of the two sections illustrated in FIG. 3E and FIG. 3F.
Figure 3C:
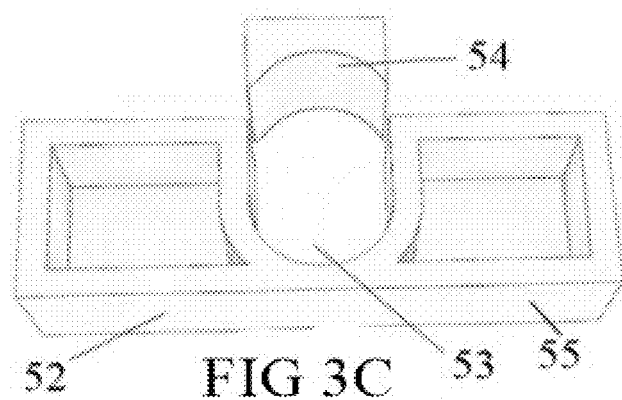
FIG. 3C shows a top view of a rectangular housing box with a central concave area that houses the freely rotatable cylindrical platform that has the friction hinge embedded in it.
Figure 3D:
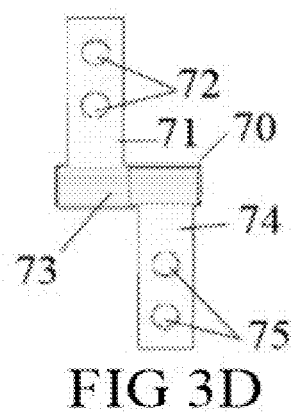
FIG. 3D shows a front perspective of a friction hinge with a constant torque profile.

The vertical section of hook 12 is its base 13 which is slightly upwardly tapered FIG. 3A, while the bottom of base 13 is slightly broader in diameter to facilitate the insertion of an upper part 71 of friction hinge 70 FIG. 3D. The bottom part of base 13 of hook 12 comprise a rectangular opening 51 that stretches inwardly upwards the length of the said base 13 to allow the insertion and embedding of the upper section 71 of friction hinge 70. Two identical holes 50 located on one side of hook base 13, line up perfectly with corresponding holes 72 of upper section 71 of friction hinge 70 when inserted. Two pegs (not shown) will permanently and securely embed the upper section 71 of hinge 70 in hook 12.

Friction hinge 70 is a constant torque friction hinge that holds its position throughout its full range of motion and while holding a mobile device in its grips. It is a durable and reliable piece of hardware that does not need further tightening or adjustment once moved to a certain angle or position. It will hold that position indefinitely until moved again. Friction hinge 70 has an upper 71, a middle 73 and a lower 74 section. It also has identical round holes in its upper and lower sections.

While upper hinge section 71 embeds in hook base 13, middle section 73 of friction hinge 70 is comprised of two cylinder-shaped counter-rotating parts held together by a central friction pin wherein lower hinge section 74 extends downward from its corresponding cylinder part and embeds in section 80 of the cylindrical rotating body 46 FIG. 3B.

Figure 3E:
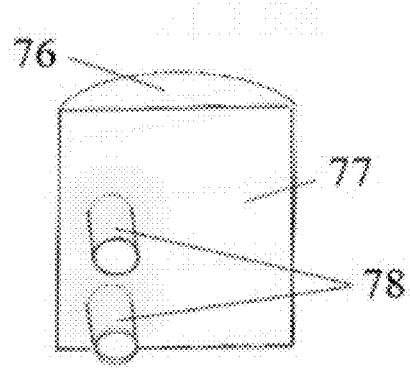
FIG. 3E shows section 1 of a freely rotatable cylindrical platform with horizontal protruding pegs designed to fit through the bottom part of a friction hinge and horizontally embed inside section 2 of a freely rotatable cylindrical platform
Figure 3F:
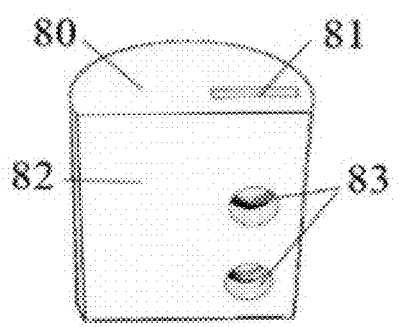
FIG. 3F shows section 2 of a freely rotatable cylindrical platform wherein the top flat surface has a rectangular opening designed to accommodate the bottom part of a friction hinge and where the inside vertical flat wall of this section 2 has a corresponding number of holes to accommodate the protruding pegs of section 1 of a freely rotatable cylindrical platform.

Bottom hinge part 74 is embedded in the larger section 80 FIG. 3F of the cylindrical body 46 by way of insertion in rectangular opening 81 located on the top surface of section 80. The protruding pegs 78 FIG. 3E of cylindrical section 76 are inserted through holes 83 of section 80, and through holes 75 of bottom hinge part 74 to ensure a permanent and secure bond. FIG. 3B shows hinge body 70 permanently embedded in cylindrical body 46.

Cylindrical body 46 is comprised of sections 76 and 80. The two sections when permanently joined FIG. 3B form a cylinder-shaped body that rests on the bottom wall of top section 48 FIG. 4A of upper body 11 with a smooth circular outside surface that slidably rotates in place and provides a stable and secure base for embedded hinge 70. Cylindrical body 46 smoothly rotates around a longitudinal axis defined by friction hinge 70 while firmly enclosed in concave area 53 FIG. 3C that is centrally located inside housing body 52 as illustrated in FIG. 3C. Adjusting the shape or design of cylindrical body 46 to improve functionality should not detract or depart from the spirit and scope of this invention disclosure.

Figure 4A:
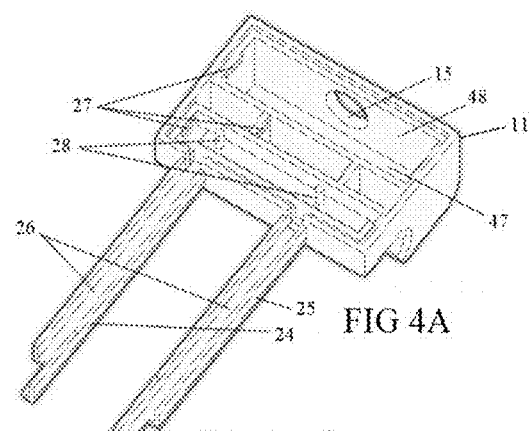
FIG. 4A shows an interior perspective view of an upper body of an embodiment of the adjustable mobile device hanger.

Turning now to FIG. 3C and FIG. 4A, housing body 52 is installed in top section 48 of upper body 11. Housing body 52 is comprised of a main rectangular body with a full front wall 55, two side walls, a bottom wall and a back wall with a round indent extending to and joined with front wall 55. Central concave indent 53 and inside facing concave wall of wedge 54 complete the round enclosure needed for the rotating stability of cylindrical body 46. The outside straight wall of wedge 54 provide a stable middle continuation of the rear outside wall of body 52.

As housing body 52 is firmly and permanently installed in the top section 48 of upper body 11, concave indent 53 is strategically and centrally positioned beneath circular opening 15 FIG. 4A located in the top wall of upper body 11 in order to facilitate the protrusion of upper section 71 of friction hinge 70. Cylindrical body 46 is then positioned vertically in concave indent 53 with hinge 70 embedded in it and protruding upwards from circular opening 15 in upper body 11 in order to be embedded in hook base 13. Wedge 54 is then permanently inserted in housing body 52 completing the smooth circular enclosure for cylindrical body 46. Smooth and stable full longitudinal rotation about Y Axis defined by hinge 70 as well as latitudinal axis pivoting about X Axis defined by the pin in center section 73 of friction hinge 70, of entire apparatus 10 is now possible.

Figure 4B:
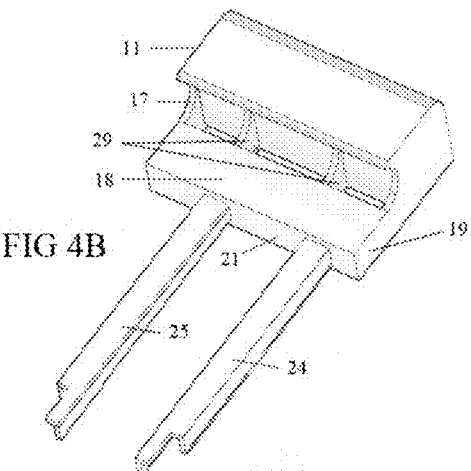
FIG. 4B shows an exterior perspective view of an upper body of an embodiment of the adjustable mobile device hanger.

Upper body 11 is comprised of several sections all integrally connected to adjoining walls or surfaces. Top flat surface 14 FIG. 1 extends the width of apparatus 10 and encompasses circular opening 15 from which top section 71 of hinge 70 protrudes to connect to hook base 13. Flat surface 14 is integrally connected to two side walls 19 and 20 as well as front sloped surface 16. Sloped surface 16 is integrally connected to and encompasses concave area 17 located underneath. Concave area 17 comprises side edges 19 and 20 as well as mid-structural ribs 29 all integrally connected to each other as well as front area 18 which is integrally connected to bottom wall 21 which is integrally connected to bottom legs 24 and 25 FIG. 4B.

FIG. 4A shows the inside structure of upper body 11 and is comprised of top section 48 where housing box 52 is ensconced. Top section 48 has a front wall integrally connected to the top, bottom and side walls. The bottom wall is integrally connected to mid-section structural ribs which are integrally connected to the bottom section of upper body 11. The bottom section is comprised of a small rectangular area with a front wall integrally connected to two side walls as well as top and bottom walls. Fixed pegs 28 protrude from the front wall. Bottom legs 24 and 25 protrude from bottom wall 21 and are integrally connected to it. Upper body snaps 27 are strategically placed on inside walls to securely connect with matching snaps on upper body back cover 40. Snaps are used in this embodiment to securely fasten the back cover 40 to the upper body 11, other fasteners such as screws can be used in other embodiments of this invention without detracting or departing from the spirit and scope of this invention disclosure.

Frontal section of upper body 11 comprise a front downwardly sloped surface 16 FIG. 1 extending forward and downward from top flat surface 14 and encompassing concave area 17 within it. Bottom center of sloped surface 16 is an arc 22 designed to support mobile device rear-facing camera's unobstructed views. Concave area 17 extends the full width of apparatus 10 and includes mid-section structural ribs 29 FIG. 4B. Concave area 17 is fully coated and lined with soft rubber-like material (not shown) to enhance and cushion the secure gripping action of upper body 11. Front wall 18 FIG. 1 located below gripping concave 17 in upper body 11 is integrally connected to bottom wall 21 and furnishes a stable vertical support for a mobile device.

Figure 2:
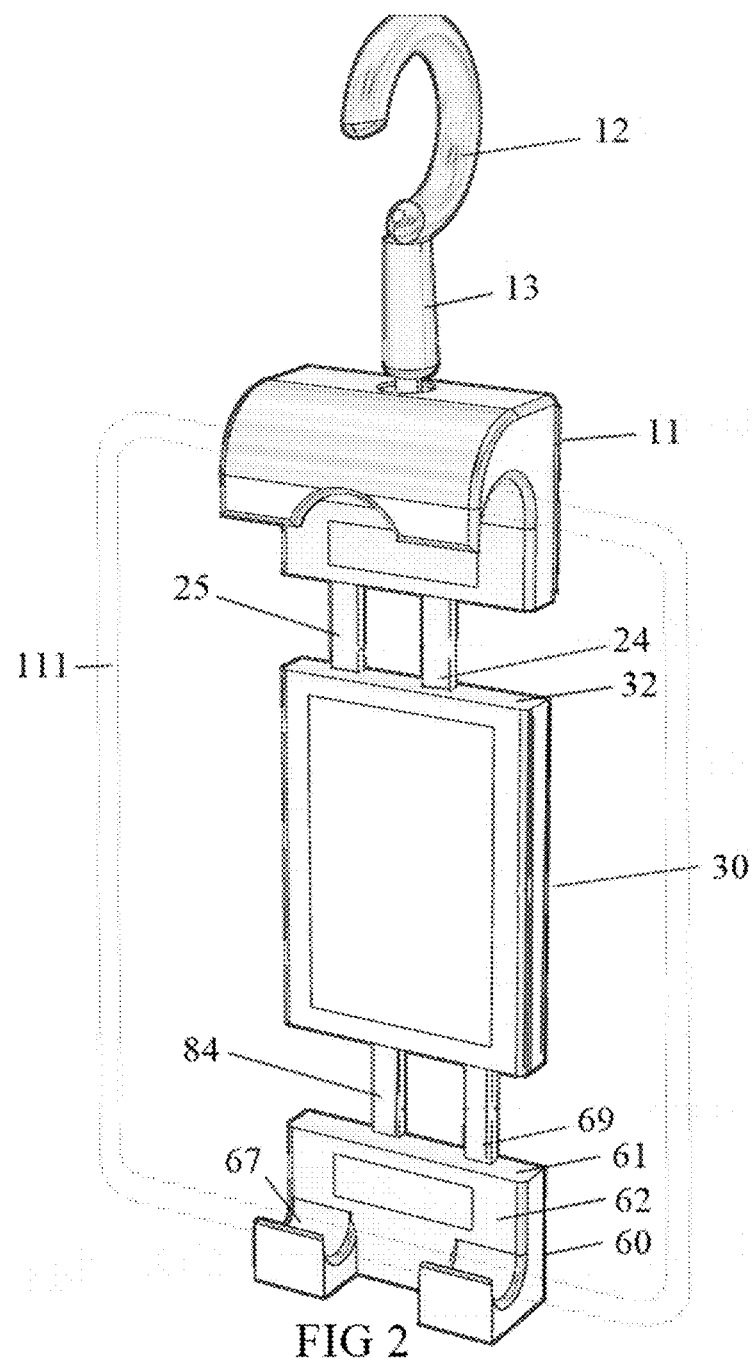
FIG. 2 shows an embodiment of an adjustable device hanger disposed in a fully extended position with the hook pivoted to face forward and a large tablet securely held in place.
Figure 5A:
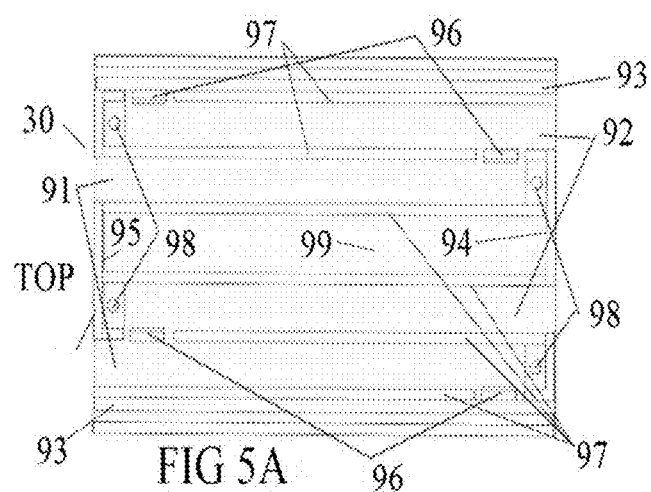
FIG. 5A shows a front view of the inside of a middle body of an embodiment of the adjustable mobile device hanger.
Figure 5B:
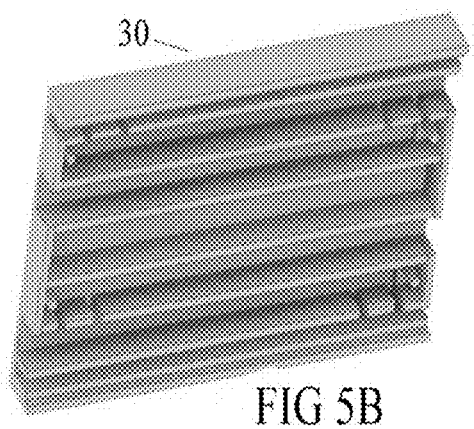
FIG. 5B shows an inside perspective view of a middle body of an embodiment of the adjustable mobile device hanger.

Upper body 11 is slidably attached to middle body 30 by two slidable legs 24 and 25 FIG. 2. Slidable legs 24 and 25 are U-shaped FIG. 4A, each with a front facing wall integrally connected to two side walls and extending downwards from bottom wall 21 of upper body 11 to stably slide inside their corresponding channel 91 in middle body 30 FIG. 5A. Slidable legs 24 and 25 are rigid, sturdy and encompass an extension spring 106 FIG. 6E each. These extension springs 106 exert a counter force when stretched by the pulling of upper body 11 away from middle body 30. Extension springs 106 with cross center loop ends 107 is tautly suspended inside U-channel ducts 26 of slidable legs 24 and 25 with top ends 107 affixed to fixed pegs 28 in the lower section of upper body 11 whereas the bottom ends 107 is affixed to corresponding, laterally lined middle body fixed pegs 98 each located at the end of channels 91.

Figure 4C:
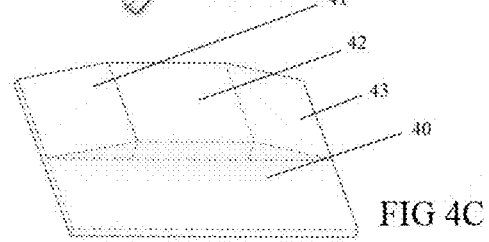
FIG. 4C shows an exterior perspective view of an upper body rear cover of an embodiment of the adjustable mobile device hanger with a multi-angled surface.
Figure 4D:
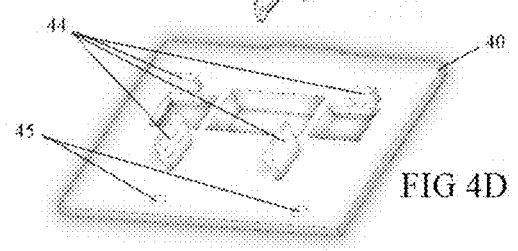
FIG. 4D shows an interior perspective view of an upper body rear cover of an embodiment of the adjustable mobile device hanger.
Figure 4E:
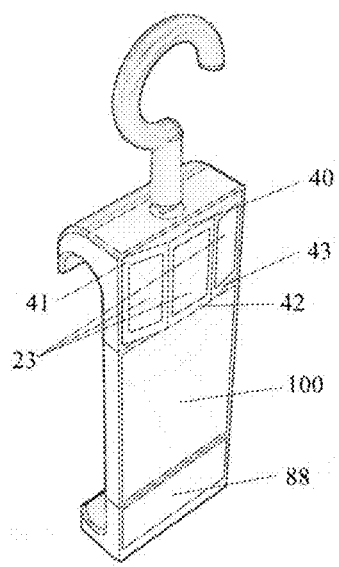
FIG. 4E shows a top rear perspective view of an embodiment of the adjustable mobile device hanger illustrating a tri-angled back rest design to facilitate the hanging of the unit at different horizontal angles on a vertical surface affording the user the best view.
Figure 7D:
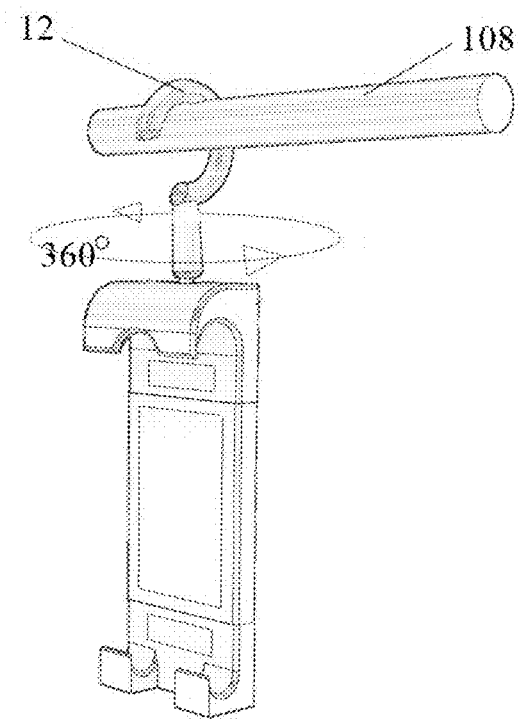
FIG. 7D shows an embodiment of an adjustable mobile device hanger utilized on a horizontal support illustrating the hanger's ability to rotate 360 degrees around a vertical axis embodied by the hook base.
Figure 7E:
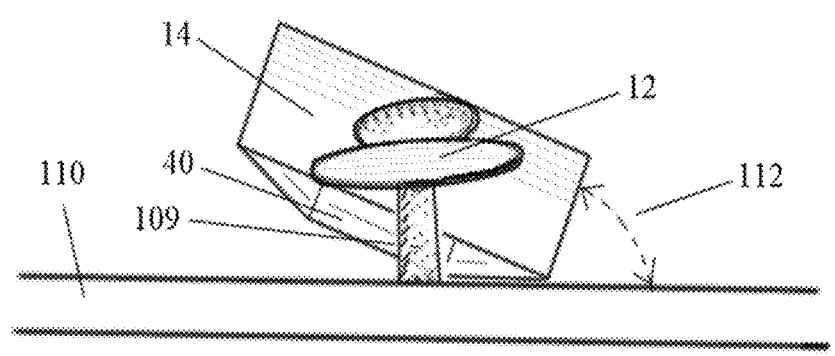
FIG. 7E shows a top view of a hanger suspended from a cabinet handle and utilizing the multi-angled back system to remain stationary at that angle until moved again.
Figure 8A:
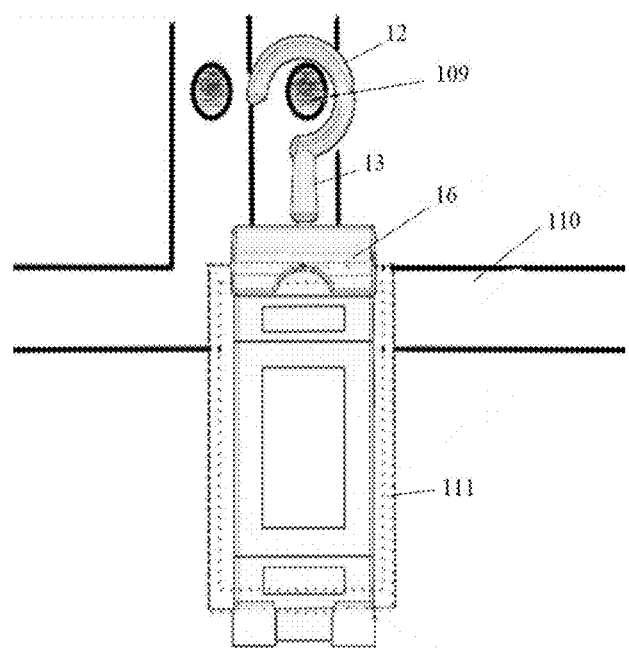
FIG. 8A illustrates a view of an embodiment of an adjustable mobile device hanger utilized in a kitchen setting and hanging from a cabinet handle.
Figure 8B:
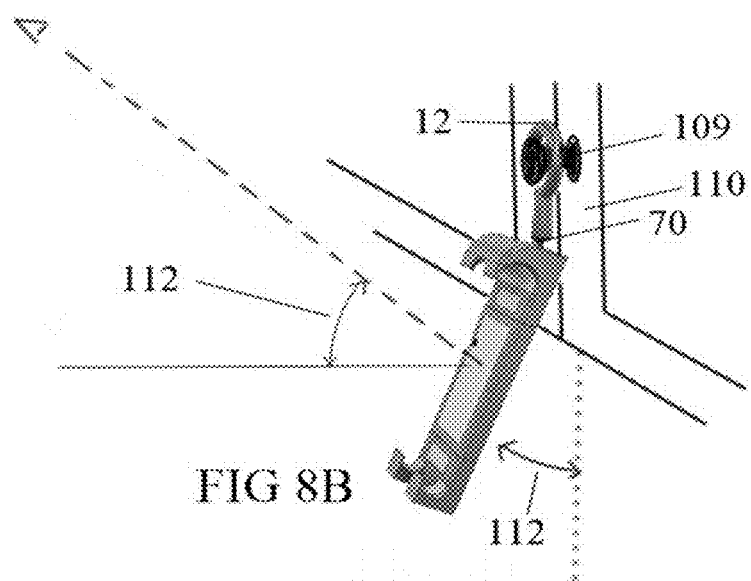
FIG. 8B shows a view of an embodiment of an adjustable mobile device hanger in a stationary pivoted orientation while hanging on a vertical surface such as a cabinet door. The viewing angle is illustrated to show the advantage of the pivoting feature to a user.
Figure 8C:
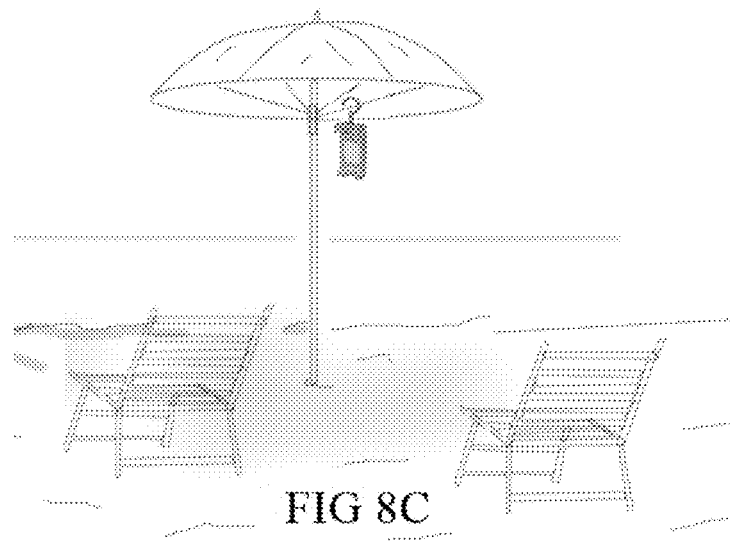
FIG. 8C illustrates the use of an embodiment of an adjustable mobile device hanger in an outdoor setting such as a beach or a camp ground where no safe flat surfaces may be feasible.
Figure 8D:
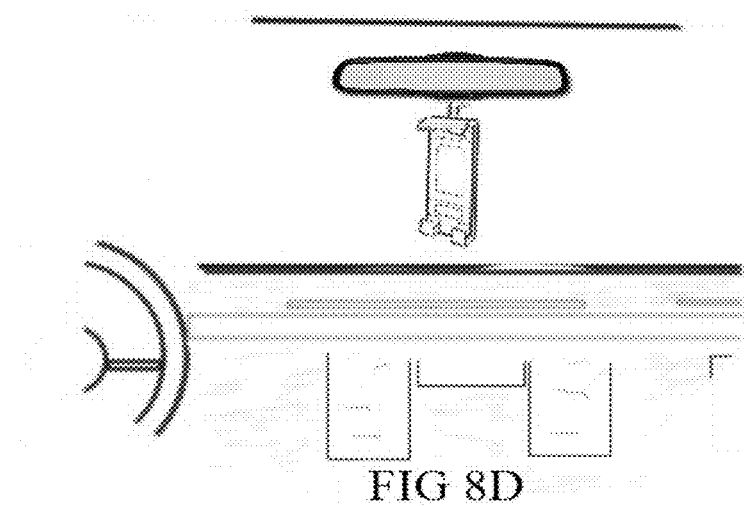
FIG. 8D illustrates an embodiment of an adjustable mobile device hanger utilized on a rear-view mirror in a vehicle without blocking a vent.
Figure 9:
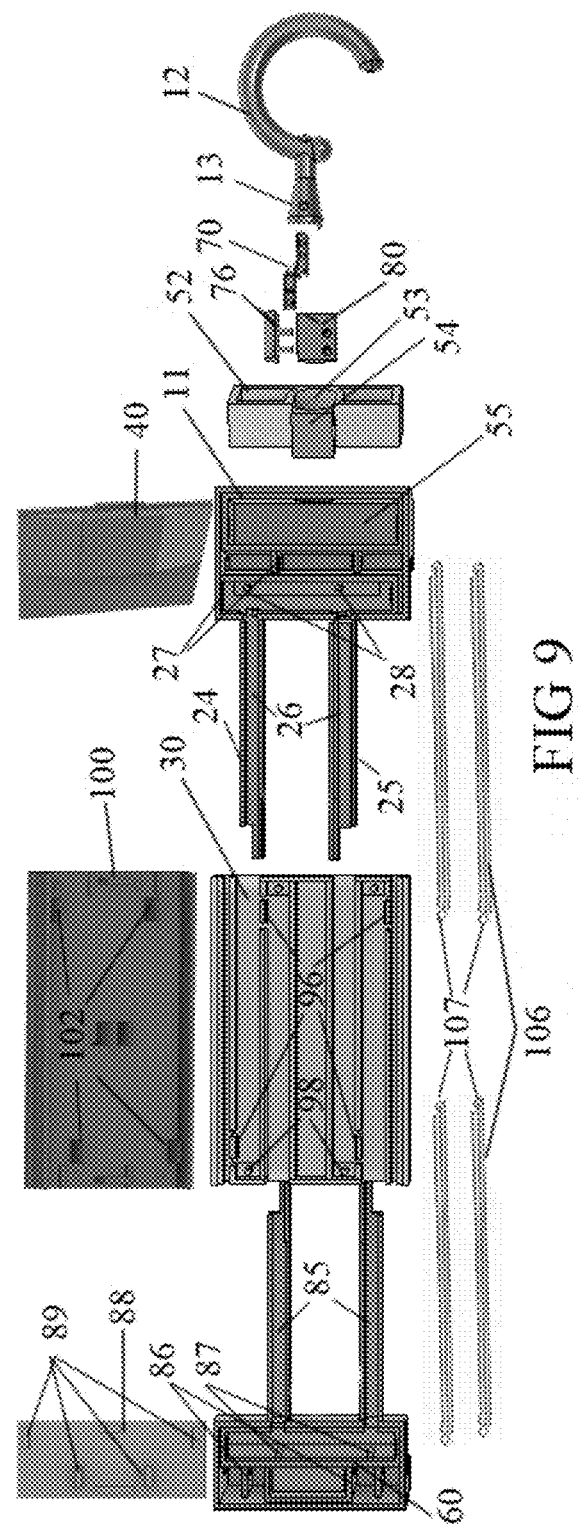
FIG. 9 is an illustration of components of an Adjustable Mobile Device Hanger according to some embodiments of the present invention.

Back cover 40 for upper body 11 is fully illustrated in FIG. 4C and FIG. 4D, and comprise outside angled surfaces 41, 42 and 43 designed to allow hanger 10 to face left, right or straight when hung on a support against a vertical surface. Rotatable cylinder 46 facilitates the rotating action while the angled back cover design 40 allows the user to comfortably view the device screen from different angles and positions and not just from a frontal position. FIG. 4D shows the inside structure of back cover 40 comprising a flat wall with protruding snaps 44, peg caps for peg support 45 and rectangular indents to support the outside angular surface. Peg caps for peg support 45 are designed to cap fixed pegs 28 in order to alleviate extension spring 106 force when apparatus 10 is in use. Back cover 40 is designed to securely attach to upper body 11 by means of snaps in this embodiment example protecting the inside components and providing a choice of viewing angles as illustrated in FIG. 7E.

Turning now to FIG. 5A to FIG. 5D which illustrate middle body 30 and its cover 100. Middle body 30 is comprised of front outside wall 31 integrally connected to outside side walls 33 and 34 and bottom outside wall 35. Inside of middle body 30 is comprised of base wall 99 integrally connected to side walls 93, inside walls 97, partial walls with snaps 96, fixed pegs 98, top wall 95 and bottom walls 94. Side walls 93 comprise a narrow groove where the outside walls 103 of middle cover 100 securely and permanently fit when cover 100 is attached. Inside walls 97 spanning the length of middle body 30 are integrally connected to bottom wall 94 and top wall 95. Top wall 95 and bottom wall 94 span the width of middle body 30 and incorporate two openings each to accommodate slidable legs 24 and 25 from the top into channels 91, and slidable legs 69 and 84 from the bottom into channels 92.

Interior walls 97 form and constitute top channels 91 and bottom channels 92 that are precisely designed to slidably contain upper slidable legs 24 and 25 of upper body 11, as well as bottom slidable legs 69 and 84 of bottom body 60. Top channels 91 start at the openings in top wall 95 and are U-shaped by walls 97 and base wall 99. They terminate at bottom wall 94 with fixed pegs 98 located midpoint widthwise of channels 91 and adjacent to wall 94. Pegs 98 provide middle body 30 anchor points for extension springs 106 enclosed in each of upper slidable legs 24 and 25.

Bottom channels 92 start at the openings in bottom wall 94 and are U-shaped by walls 97 and base wall 99. They terminate at top wall 95 with fixed pegs 98 located midpoint widthwise of channels 92 and adjacent to top wall 95. Pegs 98 provide middle body 30 an anchor point for extension springs 106 enclosed in each of lower slidable legs 69 and 84.

Partial walls with snaps 96 are strategically placed throughout middle body 30 to ensure ultimate secure adherence of middle body 30 to middle cover 100. In this embodiment example, snaps are used to secure component connections of apparatus 10. Other fasteners such as screws may also be used in other embodiments without detracting or departing from the spirit and scope of this invention disclosure.

Top channels 91 and bottom channels 92 are strategically placed in this invention to support the implementation of two slidably attached bodies. Considering there are four channels in mid body 30, each channel can be identified by its relative position from left to right when middle body 30 is held vertically. Looking at the FIG. 5A, channels 91 commencing from the top left occupy positions one and three leaving positions two and four to be occupied by bottom channels 92. When middle body 30 is turned upside down placing bottom wall 94 on top, channels 92 will occupy positions one and three while channels 91 will occupy positions two and four. This design of channel positions provides balance and stability when upper body 11 and bottom body 60 are stretched away from middle body 30.

Figure 5C:
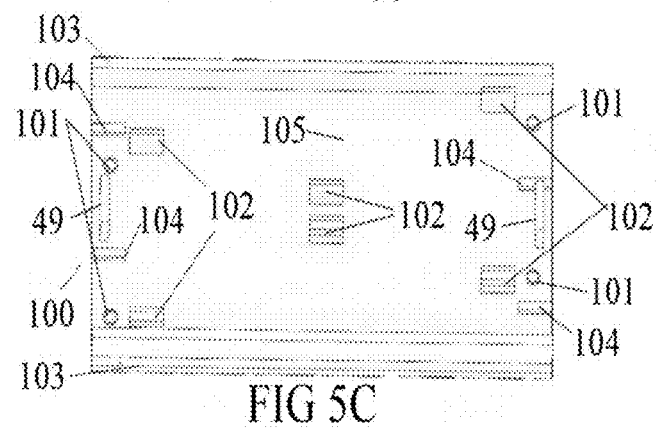
FIG. 5C shows an inside front view of a back cover of a middle body of an embodiment of the adjustable mobile device hanger.
Figure 5D:
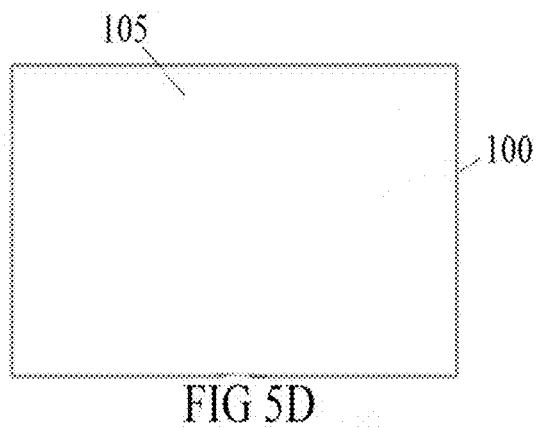
FIG. 5D shows an exterior front view of a back cover of a middle body of an embodiment of the adjustable mobile device hanger.

Looking now at FIG. 5C, middle body cover 100 is comprised of a flat base wall 105 integrally connected to side walls 103, snap sections 102, peg covers 101, slidable leg blocks 104 and stabilizers 49. Side walls 103 are designed to fit inside middle body side grooves 93 for stability and strength when cover 100 is attached on middle body 30. Snap sections 102 mirror the locations of snap sections 96 on middle body 30 and provide a balanced and stable connection between the two components. Peg caps 101 are precisely located to correspond to fixed peg 98 locations on middle body 30 to alleviate some of the force exerted on pegs 98 by extension springs 106 while apparatus 10 is in use. Peg caps 101 enclose the top portion of pegs 98 preventing bending or breakage.

There are four slidable leg blocks 104 designed to prevent slidable legs 24, 25, 69 and 84 from sliding out of their corresponding channels while force is being exerted to pull upper body 11 and bottom body 60 away from middle body 30. Blocks 104 are positioned over the open ends of slidable channels 24, 25, 69 and 84 and protrude slightly downwards where they encounter and block the unintended egress of the corresponding leg if pulled excessively. Two stabilizers 49 located at opposite top and bottom ends of middle cover 100 are designed to fit against the inside of walls 94 and 95 to aid in proper placement and increased stability.

FIG. 6A to FIG. 6D show bottom body 60 of apparatus 10 while FIG. 6E shows extension spring 106. Bottom body 60 comprises bottom wall 65 integrally connected to side walls 63 and 64 integrally connected to front wall 62 integrally connected to concave gripping area 67 integrally connected to top wall 61 integrally connected to slidable legs 69 and 84. Bottom wall 65 is flat and extends forward in two side sections 66 to encompass concave areas 67 that form the bottom gripping section of apparatus 10. Front Middle area 68 is left open to support electric charging when a device is deployed. Concave areas 67 on either front side of bottom body 60 and separated by wall 68 may comprise three structural ribs each including side walls 63 and 64 on the outside, a structural middle rib and another inside rib 67. Concave area 67 may be coated with a soft rubbery surface (not shown) or something similar to enhance grip and cushion action. Smooth rubber surface 23 FIG. 6B may also be applied to Front wall 62 to improve stability.

Slidable legs 69 and 84 extend upwards from top wall 61 in a U-shape comprising bottom wall and two side walls. Duct areas 85 enclose extension springs 106 connecting bottom body 60 to middle body 30 tautly. The interior of bottom body 60 comprise a bottom section where extensions 66 and concave areas 67 originate. Further up fixed pegs 87 are in line with their corresponding slidable legs 69 and 84 where extension springs 106 deploy. Several snaps 86 are strategically placed to firmly adhere to bottom cover 88 when attached. Top wall 61 with two openings for slidable legs 69 and 84 along with side walls 63 and 64, and bottom wall 65 form a rectangle where bottom cover 88 adheres.

Extension springs 106 with cross center loop ends 107 is tautly suspended inside the U-channel ducts 85 of slidable legs 69 and 84 with bottom ends 107 affixed to fixed pegs 87 in the upper section of bottom body 60 whereas the top ends 107 is affixed to corresponding, laterally lined middle body pegs 98 each located at the end of channels 92.

Turning now to FIG. 6C, bottom cover 88 comprise a flat base wall integrally connected to snap sections 89, stabilizers 90 and peg caps 113. Snap sections 89 are precisely placed to engage bottom body corresponding snaps 86 and lock cover 88 in place. Two stabilizers 90 designed to fit against inside of walls 61 and 65 in bottom body 60 for increased accuracy and stability. Two peg caps 113 are precisely placed to engage top section of pegs 87 of bottom body 60 to alleviate force of extension springs and enhance stability.

A mobile device such as a cell phone or tablet may be disposed within this apparatus by holding the hook 12 by hand or hanging it on any stable protruding object such as a cabinet handle or knob, a nail or screw, a rod or tree branch, rearview mirror, umbrella stand etc. Hook 12 can also rotate to hang on a narrow, horizontal, extended surface such as a laptop upper screen edge, a cavity under a vehicle hood or inside a camping tent, or the inside edge of a pocket. By simply pressing the bottom intended edge of a mobile device against bottom gripping section 67 and applying gentle downward pressure to expand the gripping gap until the top edge of the mobile device can be placed within the upper gripping area 17. Once the mobile device is securely braced, any pivoting, rotating or angling can be applied to enhance viewing position or angle. Removing the device is accomplished by reversing the above procedure by applying gentle downward pressure to release the top end of the device from the upper grip 17 and pulling the device out.

The usefulness of this invention has been demonstrated by a preferred example embodiment illustrated above. Other embodiments of this invention may include variations in size, materials, shape, form and the method of constructing a fully enclosed rotatable, pivoting platform utilizing a single hook and double extensions, are still deemed readily apparent and obvious to one skilled in the art, and all equivalent relationships to those illustrated in the drawings and described in the specifications are intended to be encompassed by the present invention.

Therefore, modifications and variations can be made to this embodiment without departing or detracting from the spirit and novel concept of this invention disclosure. The appended claims are intended to cover all such variations and modifications that fall within the spirit and scope of this invention disclosure.

What is claimed is:

1. An adjustable mobile device hanger comprising:
   a generally rectangular vertically oriented sectional body having three slidable and taut connected sections being the upper section, the middle section and the bottom section as well as the hook section at the top, wherein a mobile device such as a cell phone or tablet is securely held within the forward extending gripping segments of the upper and lower sections;
   the middle section interior comprises four vertical slidable channels created by longitudinal interior walls to slidably encompass two slidable legs from the upper section and two slidable legs from the bottom section, wherein each of said leg pairs are positioned in the first and third positions relative to the top vertical orientation and the bottom vertical orientation of the middle body enhancing stability and balance;
   each u-shaped slidable leg pair is integrally connected to either the upper section or the bottom section of the apparatus, and each leg encloses an extension spring with a cross center loop at each end wherein one loop attaches to a fixed peg at the end of each channel in the middle section, whereas the other loop attaches to a fixed peg vertically aligned with the said leg inside the corresponding upper or lower section, wherein the said extension springs exert a pulling force simultaneously between the middle section and both the upper and lower sections resulting in a taut, adjustable and independent connection between the three aforementioned sections;
   the bottom section comprises a front wall integrally connected to the top wall, the side walls and the flat bottom wall that structurally extends forward and slopes vertically upward on either side of the front wall occupying about a third of the width of the front wall from each side and creating two concave areas where the intended bottom edge of a mobile device can rest, and leaving an approximate one third unobstructed space in-between the two concave areas to facilitate electrical charging to the said mobile device while toted;
   the upper section is larger in size than the bottom section and comprises a front wall integrally connected to two side walls, a bottom wall from which the two downward facing aforementioned legs slidably extend into the middle section; the top wall is integrally connected to the side walls, is horizontally flat, encloses a central circular opening and extends forward at a downward slope encompassing a concave area that stretches the entire width of the apparatus where the intended upper edge of a mobile device can rest; a curved opening midway in the front wall of the concave area allows unobstructed view for the backward facing camera in a mobile device; both bottom section device gripping area and upper section device gripping area may be coated with soft rubber-like material to enhance the grip and cushion the mobile device;
   the interior of the upper section comprise a top area, a middle area and a bottom area wherein the bottom area comprise the integrally connected aforementioned slidable legs and two fixed pegs that anchor the aforementioned extension springs, whereas the middle area comprise structural support ribs, whereas the upper area houses the fully enclosed freely rotatable and pivoting system comprising a rectangular housing body with a central concave indent that along with a precise fitting concave wedge form a cylindrical shaped area that houses the freely rotatable cylindrical shaped component where the bottom section of the constant torque friction hinge is embedded, wherein the top section of the said hinge protrudes through the aforementioned encompassed circular opening in the top wall, and embeds inside the base of the hook;

the base of the hook is vertically aligned, cylinder shaped and upwardly tapered and is integrally connected to a roundish shaped hook; the hook section can freely and fully rotate in either direction employing the hook base as longitudinal axis, and, the hook section can pivot forward or backwards using the friction hinge's horizontally aligned central pin as latitudinal axis providing this hanger unlimited pivotal and directional capabilities; the hook can hang on a multitude of supports and surfaces while toting varying sizes of mobile devices;

the back cover for the bottom section comprise a flat outside surface, wherein the interior wall comprise snaps or fasteners, peg caps and wall supports that attach to corresponding snaps or bosses and fixed pegs inside the corresponding bottom section, wherein the back cover for the middle section comprises the same components as the bottom section mentioned above plus the slidable leg blockers that prevent the unintended egress of the said slidable legs from their middle section enclosures; the back cover of the upper section also comprises similar components as the aforementioned bottom section whereas the exterior of the back cover for the upper section comprises a multi-angled raised surface designed to facilitate clear, direct viewing of the flat device screen from varied positions while the apparatus is suspended from a support against a vertical wall.

2. The apparatus of claim 1 wherein the use of a constant torque friction hinge of varying sizes and shapes as pivoting agent that is connected to a freely rotatable system comprising varying sizes and shapes, at the bottom end and a hook shaped hanger at the top end wherein the freely rotatable system is housed in a fully enclosed section of the said apparatus, wherein the top section of the constant torque friction hinge protrudes upwards from the fully enclosed section through an opening in the top wall.

3. The apparatus of claim 1 wherein the exterior surface of a sectional back cover comprises a semi-round shaped outward raised surface to facilitate a range of viewing angles from different directions.

* * * * *